US011186188B2

(12) United States Patent
VanDuyne (10) Patent No.: US 11,186,188 B2
(45) Date of Patent: Nov. 30, 2021

(54) SYSTEM, METHOD, AND APPARATUS FOR POWERING VEHICLES

(71) Applicant: Edward A. VanDuyne, Riverview, FL (US)

(72) Inventor: Edward A. VanDuyne, Riverview, FL (US)

( * ) Notice: Subject to any disclaimer, the term of this patent is extended or adjusted under 35 U.S.C. 154(b) by 0 days.

(21) Appl. No.: 16/932,949

(22) Filed: Jul. 20, 2020

(65) Prior Publication Data

US 2020/0346550 A1 Nov. 5, 2020

Related U.S. Application Data (63) Continuation-in-part of application No. 16/286,678, filed on Feb. 27, 2019, now abandoned.

(51) Int. Cl.
| | |
|---|---|
| *B60L 53/14* | (2019.01) |
| *B60L 50/60* | (2019.01) |
| *B60L 53/66* | (2019.01) |
| *B60L 53/65* | (2019.01) |
| *B60L 50/53* | (2019.01) |

(52) U.S. Cl.
CPC ............. *B60L 53/14* (2019.02); *B60L 50/53* (2019.02); *B60L 50/60* (2019.02); *B60L 53/65* (2019.02); *B60L 53/665* (2019.02)

(58) Field of Classification Search
CPC ........ B60L 53/14; B60L 50/60; B60L 53/665; B60L 50/53; B60L 53/65
See application file for complete search history.

(56) References Cited

U.S. PATENT DOCUMENTS

| | | | |
|---|---|---|---|
| 6,471,020 B1 | 10/2002 | Hernandez | |
| 2007/0028958 A1 | 2/2007 | Retti | |
| 2013/0025168 A1* | 1/2013 | Asplund | B60M 1/36 37/207 |
| 2014/0103711 A1 | 4/2014 | Ichikawa et al. | |
| 2014/0354229 A1* | 12/2014 | Zhao | B60L 53/68 320/109 |
| 2020/0139835 A1* | 5/2020 | Miler | B60L 53/62 |
| 2021/0138911 A1* | 5/2021 | Mizutani | B60L 5/38 |

FOREIGN PATENT DOCUMENTS

GB 2548103 A 9/2017

* cited by examiner

*Primary Examiner* — Jared Fureman
*Assistant Examiner* — Duc M Pham
(74) *Attorney, Agent, or Firm* — Larson & Larson, P.A.; Frank Liebenow; Justin P. Miller (57) ABSTRACT

A system for powering vehicles is disclosed includes a roadway having of a pair of road-based conductors that move vertically with respect to the roadway from a lowered position to a raised position or vice versa. A voltage is selectively delivered across the pair of road-based conductors. A first tire of the vehicle has a first conductive surface that is in electrical contact with a first road-based conductor and a second tire of the vehicle has a second conductive surface is in electrical contact with a second road-based conductor when the pair of road-based conductors in the raised position and the voltage is conducted into the vehicle through the first conductive surface and the second conductive surface. A power system of the vehicle receives the voltage from the first conductive surface and the second conductive surface and provides power to run or charge the vehicle.

17 Claims, 10 Drawing Sheets

SYSTEM, METHOD, AND APPARATUS FOR POWERING VEHICLES

CROSS-REFERENCE TO RELATED APPLICATION

This application claims the benefit of U.S. provisional application Ser. No. 16/286,678 filed on Feb. 27, 2019, the disclosure of which is incorporated by reference.

FIELD

This invention relates to the field of power and more particularly to a system for providing power to vehicles.

BACKGROUND

Many vehicles are transforming from being drive by fossil fuel to being driven by electricity. With advances in electric motor technology, battery technology, and other energy-saving vehicle subsystems, partial or completely electricity-driven vehicles are becoming more prevalent on our roads.

There are two major classifications of such vehicles: electrically powered vehicles and hybrid vehicles, the later retaining some form of fossil-fuel engine to provide power, either directly or through a generator, when the vehicle's batteries are depleted.

For all types of electric vehicles, the batteries have a limited range, much like a tank of fuel (e.g. gasoline) for vehicles powered by fossil fuel. This range is typically between 200 and 400 miles, limiting the distance that electric vehicles are able to travel before recharging to a similar distance to vehicles that are powered by fossil fuel having a full tank of fuel. One major difference between electric vehicles and vehicles powered by fossil fuel is the time it takes to recharge. To restore a fuel tank of a vehicle powered by fossil fuel (e.g. refill) takes only a few minutes, while to recharge the batteries of an electric vehicle requires a much longer time period. For example, one major manufacturer of electric vehicles indicates that it takes 20 minutes to charge to 50%, 40 minutes to charge to 80%, and 75 minutes to 100%. This is fine when the electric vehicle is parked at home or your office has a charge station, but this extended amount of time makes it difficult to drive an electric vehicle for long distances. For example, to drive from Miami to Los Angeles requires driving around 2700 miles. If your electric vehicle is 300 miles (one major manufacturer advertises 335 miles), this drive will require nine (9) stops to completely recharge the batteries. Therefore, assuming no traffic and a sustain speed of 60 miles per hour, a fossil-fuel driven vehicle having the same range would take 45 hours of driving, plus nine stops for fuels at roughly 10 minutes per stop, for a total of 46.5 hours. For the same trip, an electric vehicle having the same range would take 45 hours of driving, plus nine stops for recharging at roughly 75 minutes per stop (approximately 11 hours), for a total of 56 hours. Therefore, assuming a few of the stops for recharging also include breaks (e.g. sleeping, dinning), it will take somewhere between 5 and 10 hours longer to drive an electric vehicle across the nation as compared to a fossil-fuel based vehicle.

What is needed is a system that will provide power to a vehicle while the vehicle is moving.

SUMMARY

In one embodiment, a system for powering vehicles is disclosed including a roadway having of a pair of road-based conductors that are parallel and move vertically with respect to the roadway from a lowered position to a raised position or from the raised position to the lowered position. A voltage is selectively delivered across the pair of road-based conductors. A first tire of the vehicle has a first conductive surface and a second tire of the vehicle has a second conductive surface such that the first conductive surface is in electrical contact with a first road-based conductor and the second conductive surface is in electrical contact with a second road-based conductor when the pair of road-based conductors in the raised position, thereby the voltage across the pair of road-based conductors is conducted into the vehicle through the first conductive surface and the second conductive surface. A power system of the vehicle receives the voltage from the first conductive surface and the second conductive surface and provides power to run or charge the vehicle.

In another embodiment, a method of providing power to a vehicle while the vehicle is on a roadway is disclosed. The method includes detecting when the vehicle is in proximity to a first road-based conductor and a second road-based conductor and responsive to detecting that the vehicle is in proximity, raising the first road-based conductor and the second road-based conductor to extend above a surface of the roadway and delivering a voltage across the first road-based conductor and the second road-based conductor. Then, one pole of the voltage is received by a first conductive surface of a first wheel of the vehicle, the first conductive surface being in electrical contact with the first road-based conductor and a second pole of the voltage is received by a second conductive surface of a second wheel of the vehicle, the second conductive surface being in electrical contact with the second road-based conductor.

In another embodiment, a system for powering vehicles on a roadway is disclosed. The roadway includes a first road-based conductor and a second road-based conductor that are parallel. There is a source of electricity and a controller. A first set of electromechanical mechanisms are electrically controlled by the controller and are coupled to a corresponding one of the first road-based conductor and the second road-based conductor such that the first set of electromechanical mechanisms move the first road-based conductor and the second road-based conductor vertically with respect to the roadway, deploying or retracting the first road-based conductor and the second road-based conductor. A first wheel of the vehicle has a first conductive surface and a second wheel of the vehicle has a second conductive surface. A vehicle detection sensor is operatively interfaced to the controller such that upon detection of the vehicle by the vehicle detection sensor, the controller electrically operates the first set of electromechanical mechanism to deploy the first road-based conductor and the second road-based conductor, and the controller connects the source of the electricity across the first road-based conductor and the second road-based conductor, thereby providing the electricity to the vehicle through the first conductive surface and the second conductive surface. Later, when the vehicle detection sensor signals an absence of the vehicle, the controller electrically operates the first set of electromechanical mechanism to retract the first road-based conductor and the second road-based conductor, and the controller disconnects the source of the electricity from the first road-based conductor and the second road-based conductor.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
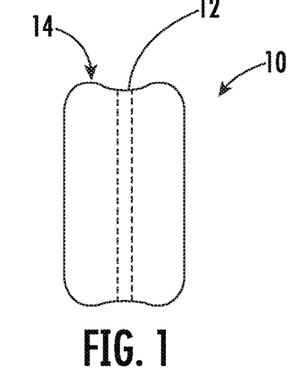
FIGS. 1, 1A, 2, and 2A illustrate a tire of a system for powering vehicles.
Figure 1A:
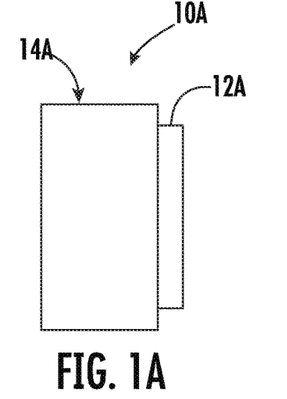
Figure 2:
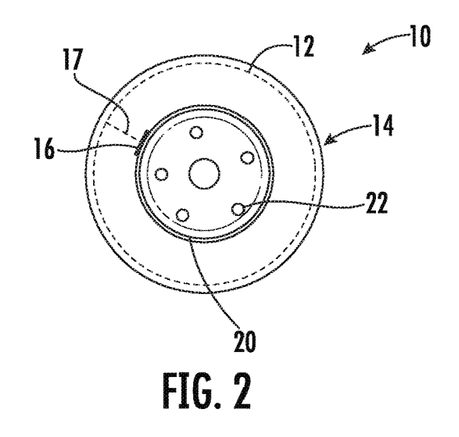
Figure 2A:
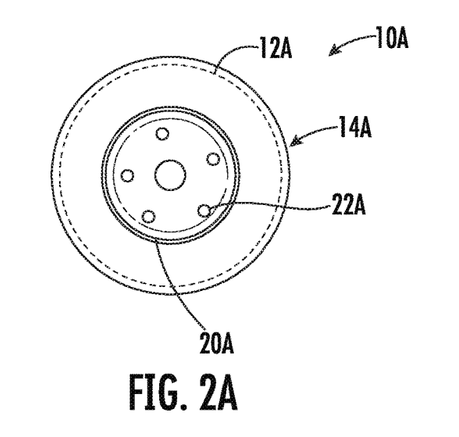

Referring to FIGS. 1, 1A, 2, and 2B, tires 10 of a system for powering vehicles are shown. In FIGS. 1 and 1A, front views of the tire 10/10A are shown having a tread 14/14A, typically made from a formulation of flexible material such as rubber, as known in the industry. The tire 10/10A of the system for powering vehicles has a conductive surface 12/12A for conducting with the road-based conductors 50/52 (see FIGS. 4-8). For the tire 10 shown in FIG. 1, power from the conductive surface 12 is transferred to along an internal conductor 17 to a pad 16 on the bead of the tire 10 where the pad 16 contacts the wheel 20. The wheel 20, being made of a conductive metal, conducts electrical current from the conductive surface 12, through the internal conductor 17, through the pad 16 and to the brake hub 30 (see FIG. 3). The wheel 20 is held to the brake hub 30 by a plurality of lugs 32 fastened with lug nuts 22, thereby completing the circuit from the conductive surface 12 to the brake hub 30.

In FIG. 1A, the conductive surface 12A is an extension of the wheel 20 and, since the wheel 20 is also conductive, the conductive surface 12A is electrically connected to the rest of the wheel 20. To reduce wear of the wheel 20 and the roadway, it is anticipated that in some embodiments, the conductive surface 12A is recessed with respect to the tire tread 14A so that when the vehicle is not running on a power rail system, the conductive surface 12A does not typically contact the roadway surface.

In some embodiments, the conductive surface 12 is recessed below the tread 14 of the tire 10, thereby limiting contact between the conductive surface and everyday road surfaces to provide proper tire-road contact for traction, steering, etc.

In some embodiments, the conductive surface 12 is a band of metal fabricated into the tire 10, for example, a band of steel or copper.

In some embodiments, the conductive surface 12 is implemented by using a conductive material in the construction of the tire 10 (e.g. a conductive rubber) and, therefore, the entire tire 10 is conductive, not just a strip around the circumference. In such when the entire tire 10 is conductive, there is no need for the internal conductor 17 and pad 16, as the entire tire 10 will conduct to the wheel 20.

Figure 3:
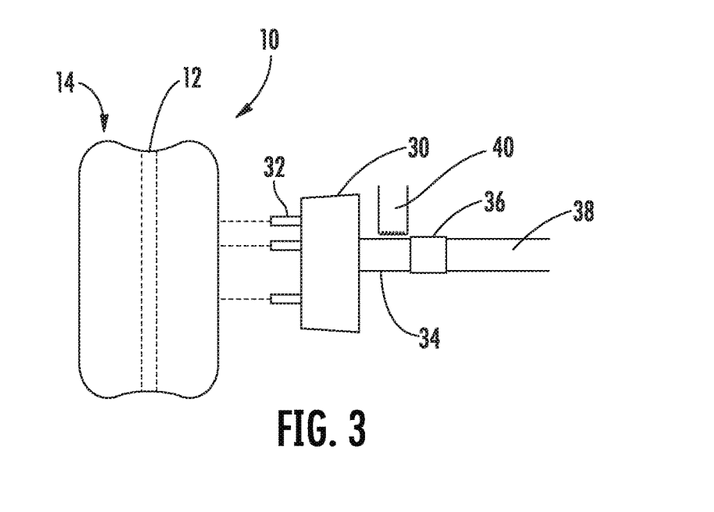
FIG. 3 illustrates the tire and hub/axle of the system for powering vehicles.

Referring to FIG. 3, the tire 10 and hub/axle of the system for powering vehicles is shown. In this view, the tire 10 is mounted to the lugs 32 of the brake hub 30, making a completed circuit between the conductive surface 12 and the brake hub 30. In the embodiment shown, the brake hub 30 is interfaced to a first section 34 of an axle, the first section 34 of the axle is electrically insulated from the second section 38 of the axle by an insulator 36 so as to not short circuit the power provided by the road-based conductors 50/52. To accept power from the tire 10 (and the road-based conductors 50/52), a pickup 40 conducts electricity from the first section 34 of the axle and, hence from one of the road-based conductors 50/52 (a similar pickup will interface to the second section 38 to conduct electricity from another of the road-based conductors 50/52).

Note that for reference in this application, the term wheelbase is generally a measurement of distance between tires on opposite sides of the vehicle 100 and, more particularly as related to the current invention, to a distance between the center of the conductive surfaces 12/12A of a left-side tire and a corresponding right-side tire.

Figure 4:
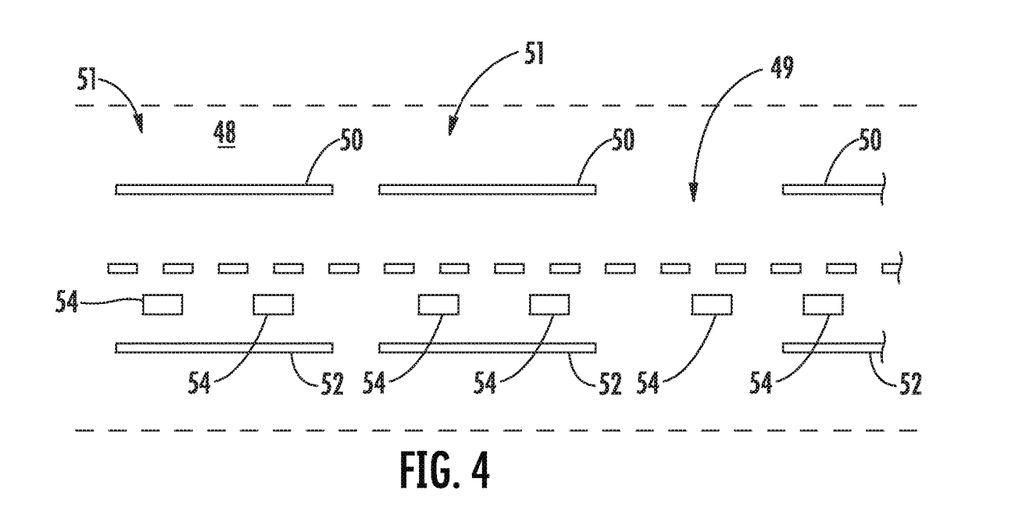
FIG. 4 illustrates a plan view of a roadway of the system for powering vehicles.
Figure 5:
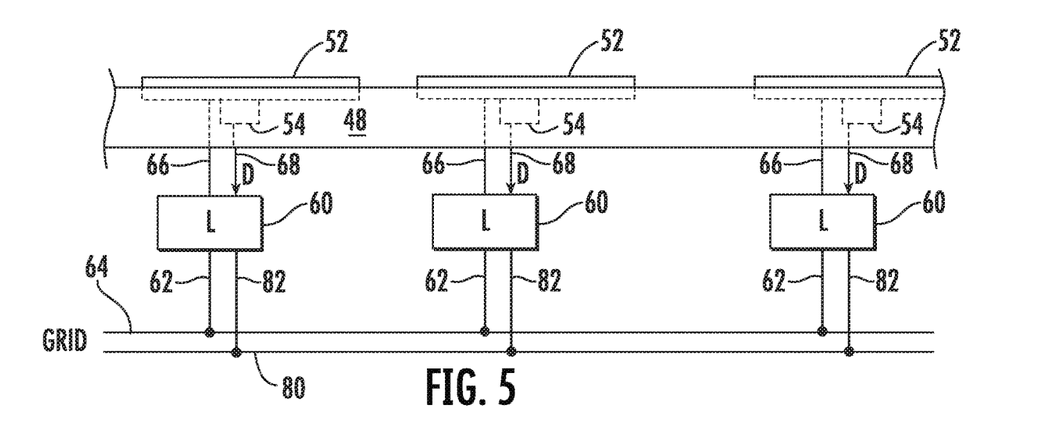
FIG. 5 illustrates a first side view of the roadway of the system for powering vehicles.
Figure 6:
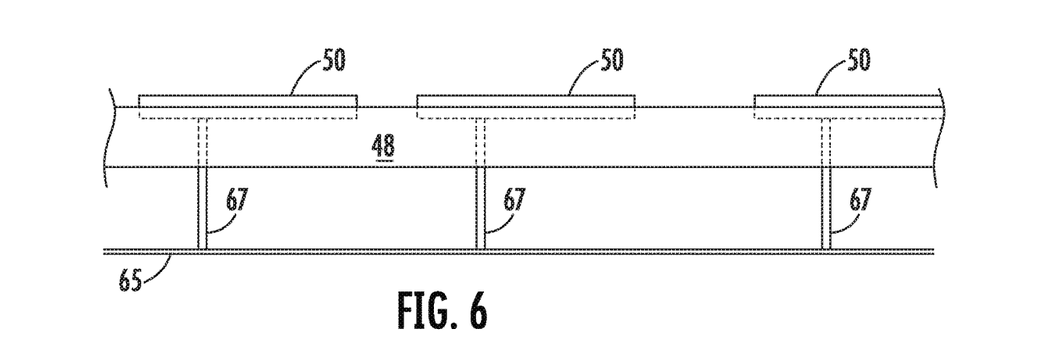
FIGS. 6, 6A, and 6B illustrates a side view from the opposite side of the roadway of the system for powering vehicles.

Referring to FIGS. 4, 5, and 6, views of a powered roadway 48 of the system for powering vehicles are shown. In FIG. 4, a view from the sky is shown. The powered roadway 48 has a plurality of road-based conductors 50/52, typically being substantially parallel to each other. Each of the road-based conductors 50/52 are powered when a vehicle 100 (see FIGS. 8 and 9) is detected by a vehicle detection sensor 54. In some embodiments, the vehicle detection sensor 54 senses the weight (mass) of the vehicle 100 (e.g. pressure on the road-based conductors 50/52), in other embodiments, the vehicle detection sensor 54 senses the electromagnetic being of the vehicle 100 or radio frequency resonance of metals from which the vehicle 100 is made. In some embodiments, the vehicle detection sensor 54 senses a radio frequency emitted by a radio frequency transmitter in the vehicle 100, in some embodiments, the vehicle detection sensor 54 senses a visual indication of the vehicle 100 such as from a camera, etc. Any form of vehicle detection sensor 54 is anticipated and included here within.

Note that the plurality of road-based conductors 50/52 are in multiple sections 51 with breaks between each section 51. By arranging each section 51 with a specific length or plurality of road-based conductors 50/52, it is anticipated that only a single vehicle 100 will be on any given section 51 at one time, thereby requiring only enough electric power at the plurality of road-based conductors 50/52 for a single vehicle 100. In alternate embodiments in which the section is much longer, it would be possible for several vehicles 100 to be on the same section 51 of road-based conductors 50/52, thereby requiring increased electrical power for that section 51. Further, in such alternate embodiments, once a vehicle 100 is detected, the entire section 51 receives electrical power, thereby increasing the possibility of a short between the road-based conductors 50/52, though current limiting will prevent failures due to a short between the road-based conductors 50/52. In some embodiments, each section 51 of road-based conductors 50/52 is of limited length, for example, a length of an average sedan.

In some embodiments, multiple far road-based conductors 50 are provided to accommodate different wheelbases. In some embodiments, the road-based conductors 50/52 are bristles that are spring loaded so that the proper set of bristles extend upwardly to contact the conductive surfaces 12 of the tires 10 based upon the wheelbase of the vehicle 100 that is detected.

As it is anticipated that the road-based conductors 50/52 are raised to a level above a surface of the powered roadway 48, it is anticipated that, once the vehicle 100 is situated on the road-based conductors 50/52 and the conductive surface 12 of the tires 10 of the vehicle 100 are in contact with respective road-based conductors 50/52, there will be a certain amount of resistance to lane changes. Therefore, as shown in FIG. 4, there will be exit areas 49 in which the gap between sections 51 of road-based conductors 50/52 is sufficient for the vehicle 100 to steer out of the lane. In such, it is anticipated that in some embodiments, the powered roadway 48 exist within a dedicated lane with limited entry and exit points, similar to those dedicated to high-occupancy vehicles (HOV lanes).

In FIG. 5, a side cut-away view of hot side of the powered roadway 48 is shown. In this, the near road-based conductor 52 is shown slightly raised above the powered roadway 48. The near road-based conductor 52 selectively receives a first pole of power through conductors 66 that connect the near road-based conductor 52 to a power switching device 72 (see FIG. 7) such as a relay or solid-state switch within a logic or processor-based circuit 60. Power for the powered roadway 48 is provided from a power grid 64 (source of electricity) that is connected to the other side of the power switching device 72. The power switching device 72 is controlled by switch control logic 70 (see FIG. 7). The switch control logic 70 reads the vehicle detection sensor 54 to determine if a vehicle 100 is present above the associated section 51 of road-based conductors 50/52. If the switch control logic 70 determines a vehicle 100 is present, the switch control logic 70 enables the power switching device 72 so that electrical power is provided to the near road-based conductor 52. In some embodiments, the switch control logic 70 includes a current limiting feature that prevents excess current flow through the road-based conductors 50/52 should a short circuit occur (e.g. a short from a snow plow blade).

Power is provided to the power switching device 72 by another conductor 62 that connects the power switching device 72 to the power grid 64. Note that, in some embodiments, the voltage potential delivered to the near road-based conductor 52 is set to a voltage deemed save for most form of life, for example, 48 volts, though there is no limitation on any particular voltage, either direct current or alternating current. Note also that it is fully anticipated that the power grid 64 be provided with a higher voltage for long-haul distribution using smaller gauge wires and, periodic voltage reducing transformers are placed along the grid to provide a lower voltage to one or more sections 51 of the road-based conductors 50/52.

Also, in some embodiments, the vehicle detection sensor 54 also senses an identification of the vehicle 100 by, for example, an RFID associated with the vehicle 100 and sensed by the vehicle detection sensor 54, by a radio frequency signal emitted by the vehicle 100 and received/detected by the vehicle detection sensor 54, by camera and image recognition, or any way known. In some embodiments, the vehicle detection sensor 54 is the same as used for quick pass access to toll roads. In any case, in such embodiments, having an identification of the vehicle 100, the system for powering vehicles has the ability to know which vehicle 100 is accepting power and, therefore, has the ability to charge each vehicle 100 for an amount of power used by the vehicle 100. Further, in some embodiments, while the vehicle 100 is detected and recognized (e.g. the system for powering vehicles has an identification of the vehicle 100), a circuit in the power switching device 72 measures the amount of power used by the vehicle 100 for billing of the amount of power used, as once the batteries 112 (see FIGS. 8 and 9) of the vehicle 100 are charged, less power is required from the system for powering vehicles.

For control of the system for powering vehicles and for receiving data from each section 51 of the road-based conductors 50/52, in some embodiments a data bus 80 is connected to the switch control logic 70 through data connections 82. The data bus 80 is anticipated to be any networking media such as Ethernet. In some embodiments, the data is modulated over the power grid 64 instead of requiring the data bus. In some embodiments, each time a vehicle 100 is detected, then moves off of the section 51, a data record containing the vehicle identification and an amount of usage (either calculated based upon power usage or estimated based upon an amount of time that the vehicle 100 is on the section 51) is transmitted to a central location (e.g. over the data bus) for later billing.

In some embodiments, identities of vehicles 100 with outstanding debts are included in a blacklist that is distributed to the switch control logic 70, for example, through data connections 82. In such embodiments, if an owner of the vehicle 100 has not paid a bill for a certain amount of time, the identification to the vehicle 100 is included in the blacklist and, when the vehicle 100 is detected, if the identification of the vehicle 100 matches an entry in the blacklist, the switch control logic 70 does not enable the power switching device 72 and, therefore, no power is provided to the vehicle 100.

In FIG. 6, a side cut-away view of the of the ground side of the powered roadway 48 is shown. In this, the far road-based conductor 50 is shown slightly raised above the powered roadway 48. The far road-based conductor 50, in this embodiment, is connected to a ground, second pole, or neutral leg 65 of the power grid by a ground conductor 67.

Figure 6A:
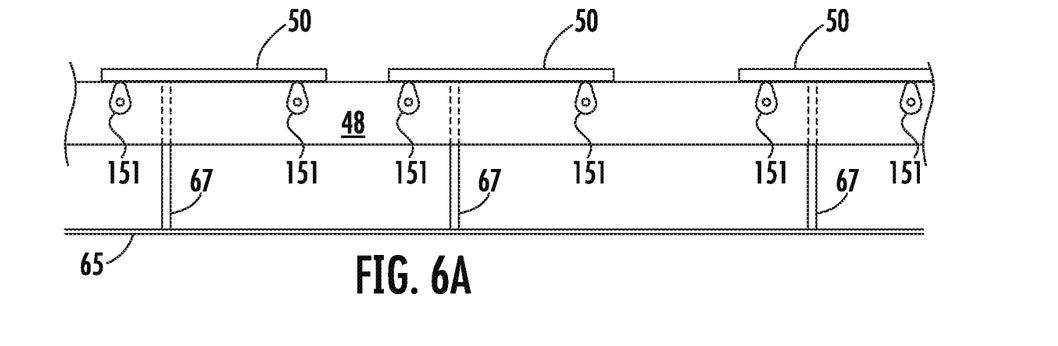
Figure 6B:
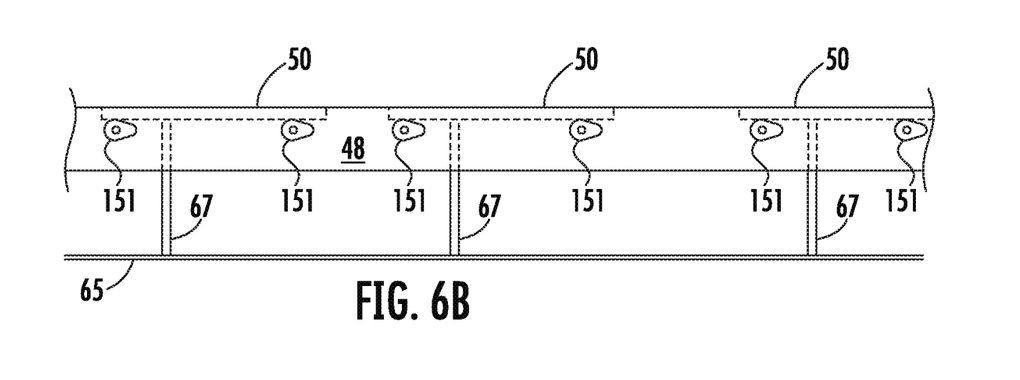

In FIGS. 6A and 6B, a side cut-away view of the of the ground side of the powered roadway 48 is shown with a raising/lowering mechanism. It is fully anticipated that a similar or same raising/lowering mechanism be used for the hot side of the powered roadway 48, which is not shown for brevity and clarity reasons. In this example, the raising/lowering mechanism is a plurality of cams 151 that are turned by a motor/actuator 52 (see FIG. 7). In FIG. 6A, the cams 151 are rotated to push the far road-based conductors 50/52 up for making contact with the conductive surface 12/12A of the tires on one side of the vehicle 100 (see FIG. 8). Although shown as cams 151 that are turned by motors 153, any electromechanical raising/lowering mechanism is anticipated including actuator-driven screw jacks, screw-actuators, electromagnets, etc. In some embodiments, the raising/lowering mechanism is entirely mechanical, in that, when the weight of the vehicle 100 is exerted on a plate, the plate lowers and pushes a fulcrum that raises the road-based conductors 50/52.

In FIG. 6B, the cams 151 are rotated to release and lower the road-based conductor 50/52 to a location where the road-based conductors 50/52 do not make contact with the conductive surface 12/12A of the tires and, preferably substantially flush or below the surface of the roadway, allowing maneuvering of the vehicle 100 without impedance from the road-based conductors 50/52.

As will be discussed with FIG. 10, it is anticipated that the raising/lowering mechanism be controlled by the processor 170 responsive to detection of the vehicle 100 and, in some embodiments, responsive to payment of a fee for the ability to use and obtain power from the powered roadway 48.

Figure 7:
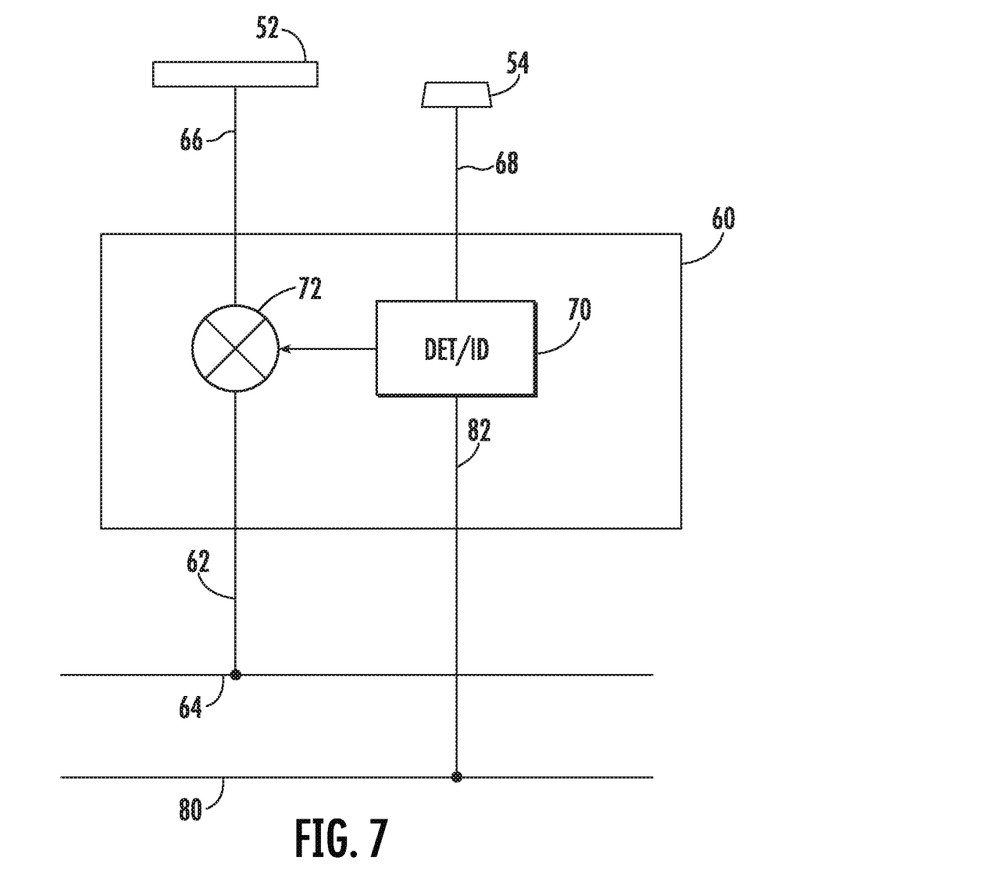
FIGS. 7, 7A, and 7B illustrate schematic views of a roadway of the system for powering vehicles.
Figure 7A:
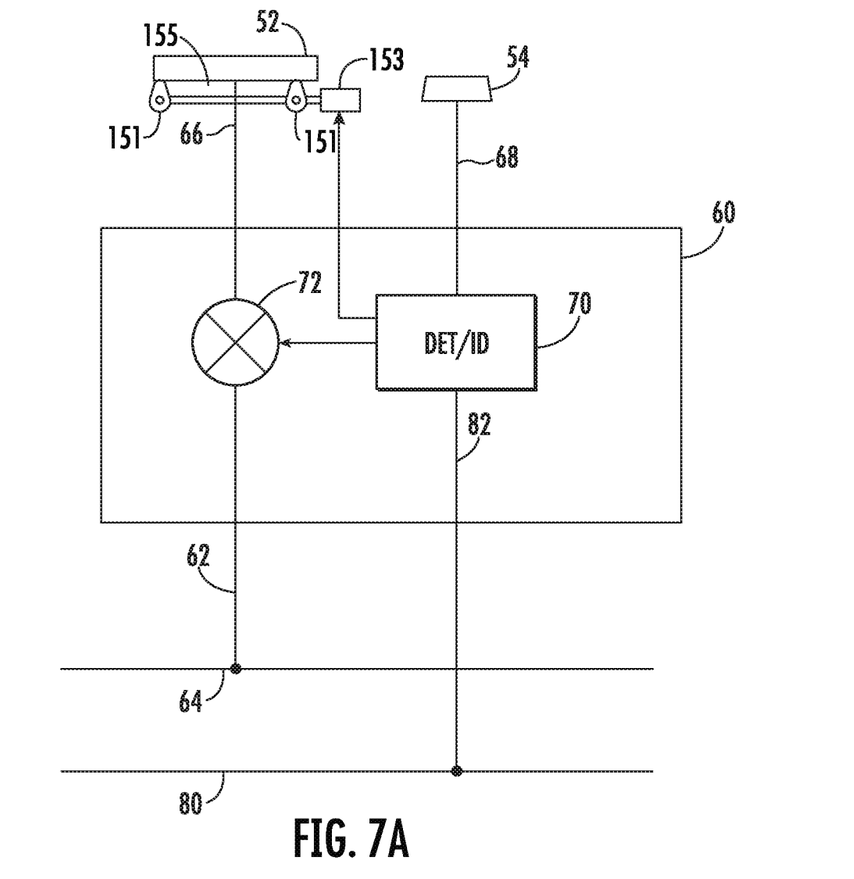
Figure 7B:
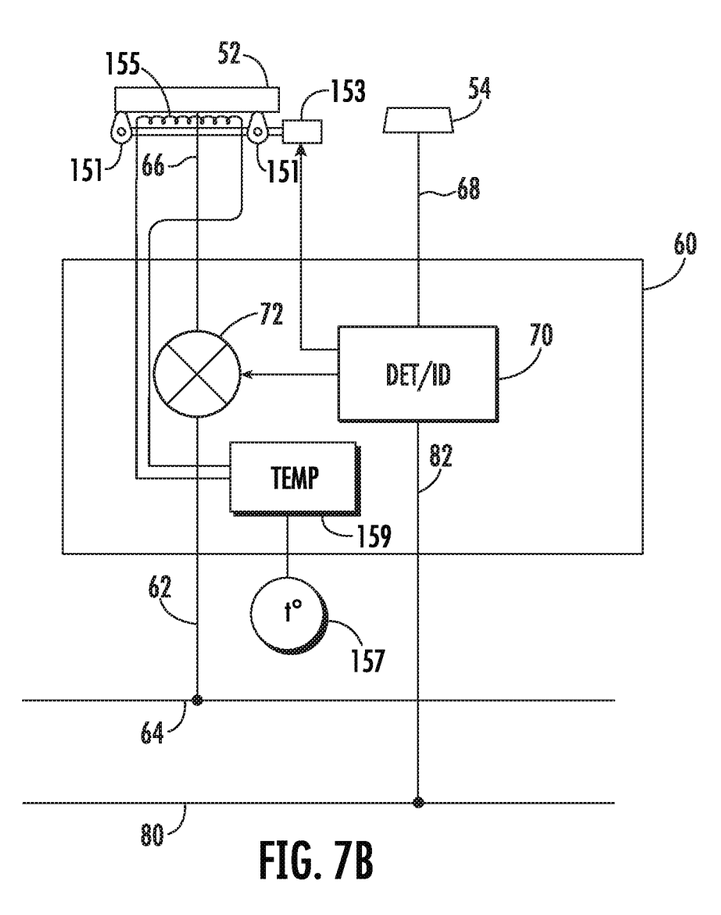

Referring to FIG. 7, a schematic view of a powered roadway 48 of the system for powering vehicles is shown. The near road-based conductor 52 selectively receives power through conductors 66 that connect the near road-based conductor 52 to a power switching device 72 such as a relay or solid-state switch. Power for the powered roadway 48 is provided from a power grid 64 that is connected to the power switching device 72. The power switching device 72 is controlled by switch control logic 70 which, in some embodiments, is processor-based (e.g. micro-controller). The switch control logic 70 reads the vehicle detection sensor 54 through a cable 68 to determine if a vehicle 100 is present above the associated section 51 of road-based conductors 50/52. If the switch control logic 70 determines a vehicle 100 is present, the switch control logic 70 enables the power switching device 72 so that electrical power is provided to the near road-based conductor 52. In some embodiments, the switch control logic 70 includes a current limiting feature that prevents excess current flow through the road-based conductors 50/52 should a short circuit occur (e.g. a short from a snow plow blade).

Power is provided to the power switching device 72 by another conductor 62 that connects the power switching device 72 to the power grid 64. As discussed above, in some embodiments, the voltage potential delivered to the near road-based conductor 52 is set to a voltage deemed save for most form of life, for example, 48 volts, though there is no limitation on any particular voltage, either direct current or alternating current. In some embodiments, the power grid 64 is provided with a higher voltage suitable for long-haul distribution using smaller gauge wires and, voltage reducing transformers are placed along the grid to provide a lower voltage to one or more sections 51 of the road-based conductors 50/52.

Also, in some embodiments, the vehicle detection sensor 54 also senses an identity of the vehicle 100 by, for example, an RFID associated with the vehicle 100 is sensed by the vehicle detection sensor 54, a radio frequency signal emitted by the vehicle 100 and received/detected by the vehicle detection sensor 54, a camera and image recognition detects the vehicle 100, or any way known. In some embodiments, the vehicle detection sensor 54 is the same as used for quick pass access to toll roads. In any case, in such embodiments, having an identification of the vehicle 100, the system for powering vehicles has the ability to know which vehicle 100 is accepting power and, therefore, has the ability to charge money for that vehicle 100 based upon an amount of power used by the vehicle 100. Further, in some embodiments, while the vehicle 100 is detected and recognized (e.g. the system for powering vehicles has an identification of the vehicle 100), a circuit in the power switching device 72 measures the amount of electrical power delivered to the vehicle 100 for billing of the amount of electrical power used, as once the batteries 112 (see FIGS. 8 and 9) of the vehicle 100 are charged, less power is required from the system for powering vehicles.

For control of the system for powering vehicles and for receiving data from each section 51 of the road-based conductors 50/52, in some embodiments a data bus 80 is connected to the switch control logic 70 through data connections 82. The data bus 80 is anticipated to be any networking media such as Ethernet. In some embodiments, the data is modulated over the power grid 64 instead of requiring a separate data bus 80. In some embodiments, each time a vehicle 100 is detected on a section 51, then moves off of the section 51, a data record containing the vehicle identification and an amount of electrical power usage (either calculated based upon power usage or estimated based upon an amount of time that the vehicle 100 is on the section 51) is transmitted to a central location (e.g. over the data bus) for later billing.

In some embodiments, identities of vehicles 100 with outstanding debts are included in a blacklist that is distributed to the switch control logic 70 (typically processor-based with storage), for example, through data connections 82. In such embodiments, if an owner of the vehicle 100 has not paid a bill for a certain amount of time, the identification to the vehicle 100 is included in the blacklist and, when the vehicle 100 is detected, if the identification of the vehicle 100 matches an entry in the blacklist, the switch control logic 70 does not enable the power switching device 72 and, therefore, no electric power is provided to the vehicle 100.

In some embodiments, the road-based conductors 50/52 have heating elements 155, either integrated within the road-based conductors 50/52 or in thermal conduction with the road-based conductors 50/52. In such, a road-based conductors temperature controller 159 monitors the temperature of the roadway, for example, by way of a temperature sensor 157 or through local weather reports, and selectively controls the heating elements 155 to provide heat energy to the road-based conductors 50/52 should the temperature around the roadway drop below a certain temperature threshold.

In some embodiments, a modulator/demodulator 200 modulated data onto the road-based conductors 50/52 to provide communications with a similar modulator/demodulator of the vehicle 100, thereby providing data services such as Internet to occupants of the vehicle 100. In some embodiments, a wireless signal is provided to provide data services to the vehicle 100.

Figure 8:
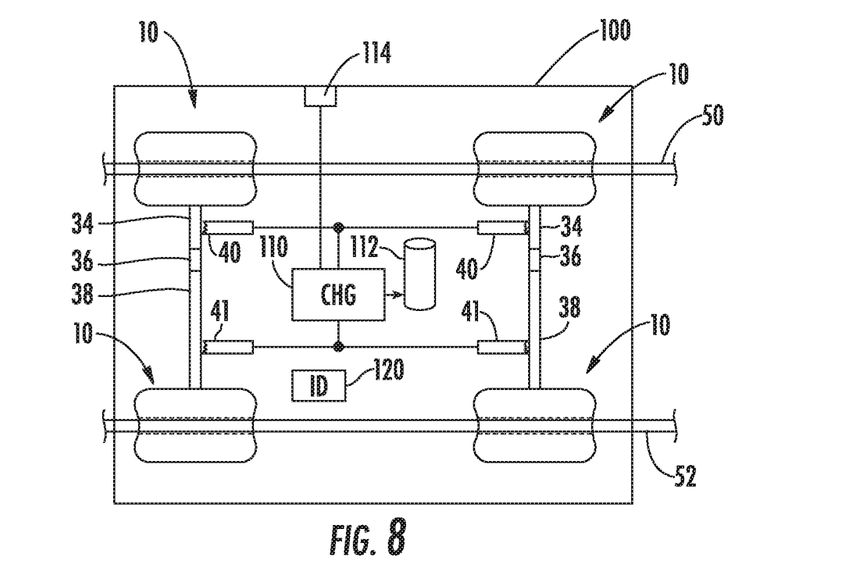
FIG. 8 illustrates a schematic view of the vehicle portion of the system for powering vehicles.
Figure 9:
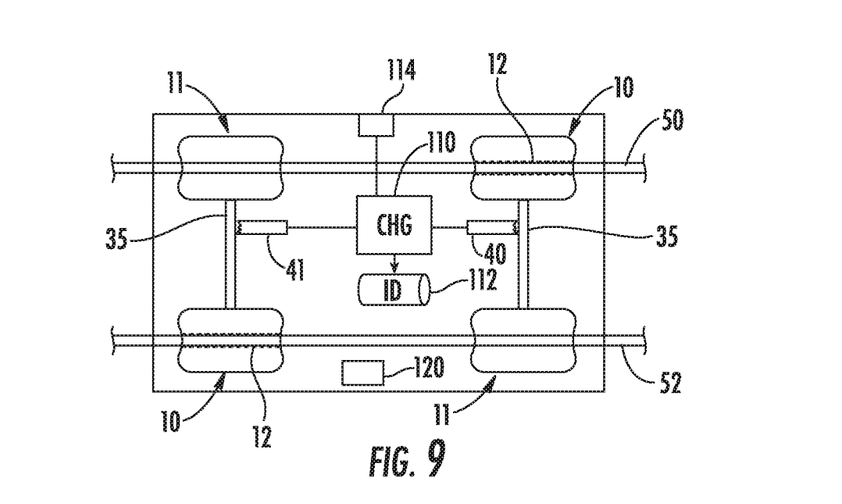
FIG. 9 illustrates an alternate schematic view of the vehicle portion of the system for powering vehicles.

Referring to FIGS. 8 and 9, schematic views of an exemplary vehicle 100 utilizing the system for powering vehicles are shown. In FIG. 8, the vehicle 100 has four of the tires 10 with conductive surfaces 12. Ground potential from the far road-based conductor 50 is received by a first pair of the tires 10 and delivered to the first section 34 of the axle where first pickups 40 connect the charge circuit 110 of the vehicle 100 to ground potential. Electrical power from the near road-based conductor 52 is received by a second pair of the tires 10 and delivered to the second section 38 of the axle where second pickups 41 deliver the electrical power to the charge circuit 110 of the vehicle 100. The charge circuit 110 provides charge current to the batteries 112 of the vehicle 100 (and, in some embodiments, operational power to electric motors of the vehicle 100 that are not shown for clarity reasons). As with existing vehicles 100 that operate on electrical power, a charge port 114 is provided for charging the vehicle 100 from a charging station.

In FIG. 9, the vehicle 100 has two tires 10 with conductive surfaces 12 and two tires 11 that do not conduct. Ground potential from the far road-based conductor 50 is received by a first the tires 10 with conductive surfaces 12 and is connected to a solid axle 35 where first pickups 40 connect the charge circuit 110 of the vehicle 100 to ground potential. Electrical power from the near road-based conductor 52 is received by a second of the tires 10 with conductive surfaces 12 and delivered to a different solid axle 35 where second pickups 41 deliver the electrical power to the charge circuit 110 of the vehicle 100. As above, the charge circuit 110 provides charge current to the batteries 112 of the vehicle 100 (and, in some embodiments, operational power to electric motors of the vehicle 100 that are not shown for clarity reasons). As with existing vehicles 100 that operate on electrical power, a charge port 114 is provided for charging the vehicle 100 from a charging station.

In both FIGS. 8 and 9, an optional identification device 120 is shown. In some embodiments, the optional identification device 120 is detected by the vehicle detection sensor 54 to sense presence of a vehicle 100 that is authorized to receive power from the powered roadway 48. In some embodiments, the optional identification device 120 includes an identification code that uniquely identifies the vehicle 100 for purposes of enabling electrical power to only those vehicles 100 that are registered, are in good standing, etc.

Figure 10:
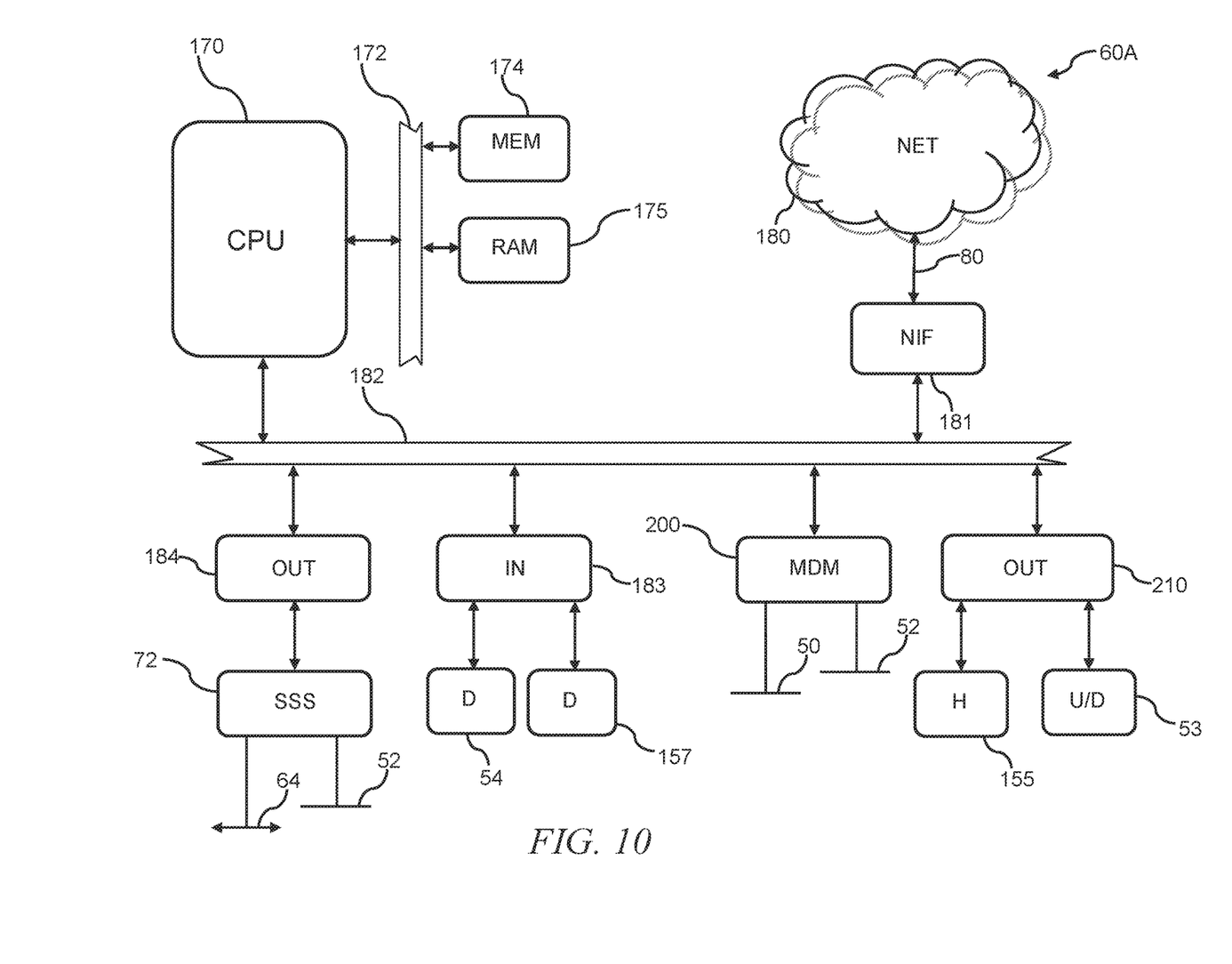
FIG. 10 illustrates a schematic view of a processor-based circuit 60A.

Referring to FIG. 10, a schematic view of a processor-based circuit 60A is shown. The exemplary processor-based circuit 60A provides control to a section 51 of road-based conductors 50/52. The present invention is in no way limited to any particular configuration.

The exemplary processor-based circuit 60A is shown in its simplest form. Different architectures are known that accomplish similar results in a similar fashion, and the present invention is not limited in any way to any particular system architecture or implementation. In this exemplary processor-based circuit 60A, a processor 170 executes or runs programs in a random-access memory 175. The programs are generally stored within a persistent memory 174 and loaded into the random-access memory 175 when needed. The processor 170 is any processor, typically a processor designed for phones. The persistent memory 174 and random-access memory 175 are connected to the processor by, for example, a memory bus 172. The random-access memory 175 is any memory suitable for connection and operation with the selected processor 170, such as SRAM, DRAM, SDRAM, RDRAM, DDR, DDR-2, etc. The persistent memory 174 is any type, configuration, capacity of memory suitable for persistently storing data, for example, flash memory, read only memory, battery-backed memory, etc. In some embodiments, the blacklist is stored in the persistent memory 174.

Also connected to the processor 170 is a system bus 182 for connecting to peripheral subsystems such as a network interface 181, an output port 184 for driving the power switching device 72, and an input port 183 for reading the vehicle detection sensor 54, though there is no restriction on inputs and outputs.

In general, some portion of the persistent memory 174 is used to store programs, executable code, and data, etc.

The network interface 181 connects the exemplary processor-based circuit 60A to the network 180 through a data bus 80. There is no limitation on the type of connection used. The network interface 181 provides data and messaging connections between exemplary processor-based circuit 60A and a server (not shown for clarity reasons) through the network 180.

In some embodiments, the road-based conductors 50/52 are movable, either up/down to deploy when not in use and engage when in use, or sideways to accommodate different wheelbases (e.g. differing distances between the conductive surfaces 12/12A due to different size vehicles 100). In some such embodiments, data from one or more vehicle detection sensors 54 is used to determine position and velocity of the vehicle 100 and this data is used to determine when to raise or lower the road-based conductors 50/52. For example, as the vehicle 100 approaches a leading edge of a section of road-based conductors 50/52, software running on the processor 170 predicts the time that the vehicle will be positioned over that section of road-based conductors 50/52 and, through another output port 210, controls the motors 153 (or other rail control mechanism) to raise each of the road-based conductors 50/52 of that section to contact with the conductive surfaces 12/12A of the vehicle 100 that is over that section. As the vehicle 100 approaches a trailing edge of a section of road-based conductors 50/52, software running on the processor 170 controls the motors 153 (or other rail control mechanism) to lower each of the road-based conductors 50/52 of that section unless another vehicle 100 is over that section of the road-based conductors.

In some embodiments, the vehicle detection sensors 54 also provide data regarding the vehicle such as vehicle type (e.g. indication of wheel base), vehicle velocity, vehicle current battery capacity, and vehicle account number. In some such embodiments, it is anticipated that the vehicle detection sensors 54 communicate with an electronic system of the vehicle 100 to read such data. In some such embodiments, it is anticipated that the vehicle detection sensors 54 read a visible or electronic device of the vehicle to identify the vehicle, for example, a bar code or electronic device as used for highway tolls.

In some embodiments, the vehicle account number is used to determine financial status as it is anticipated that each vehicle be registered and must provide payment means for the energy used during the charging process. If the financial status indicates there are insufficient funds or bad credit, no charging will be provided and the software running on the processor 170 will control the motors 153 (or other rail control mechanism) to lower (or keep lowered) the road-based conductors 50/52 of that section so as to not provide charging to such vehicle 100. In some embodiments, the vehicle battery capacity is used to determine whether the vehicle 100 requires charging. For example, if the vehicle battery capacity indicates there is over a certain threshold of battery power available from the vehicle's 100 batteries, no charging will be provided to reduce wear. The software running on the processor 170 will control the motors 153 (or other rail control mechanism) to lower (or keep lowered) the road-based conductors 50/52 of that section so as to not provide charging to such vehicle 100, as the vehicle 100 has sufficient battery charge.

In embodiments in which the road-based conductors 50/52 have heating elements 155, either integrated within the road-based conductors 50/52 or in thermal conduction with the road-based conductors 50/52 software running on the processor monitors the temperature of the roadway, for example, by way of a temperature sensor 157 connected to the input port 183 or through local weather reports, and selectively controls the heating elements 155 through the port 210 to provide heat energy to the road-based conductors 50/52 should the temperature around the roadway drop below a certain temperature threshold.

In some embodiments, the powered roadway 48 has a fixed distance between the road-based conductors 50/52 and, therefore, is only useful for vehicles 100 having a wheelbase that corresponds to the distance between the road-based conductors 50/52. In other embodiments as shown in FIGS. 11-14, the powered roadway 48 has adjustable or adaptable road-based conductors 50A/50B/50C/52A/52B/52C that adapt the wheelbase of the vehicle 100.

Figure 11:
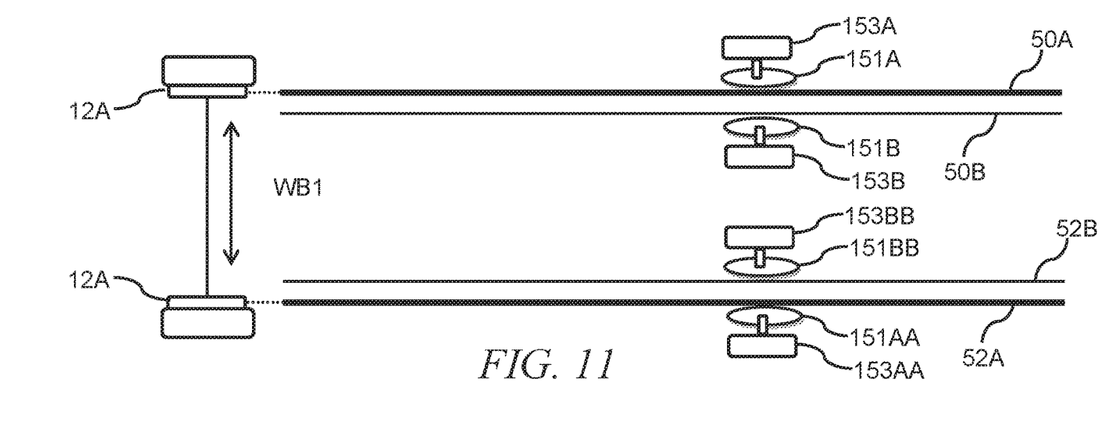
FIGS. 11-14 illustrate schematic views of the roadway of the system for powering vehicles.
Figure 12:
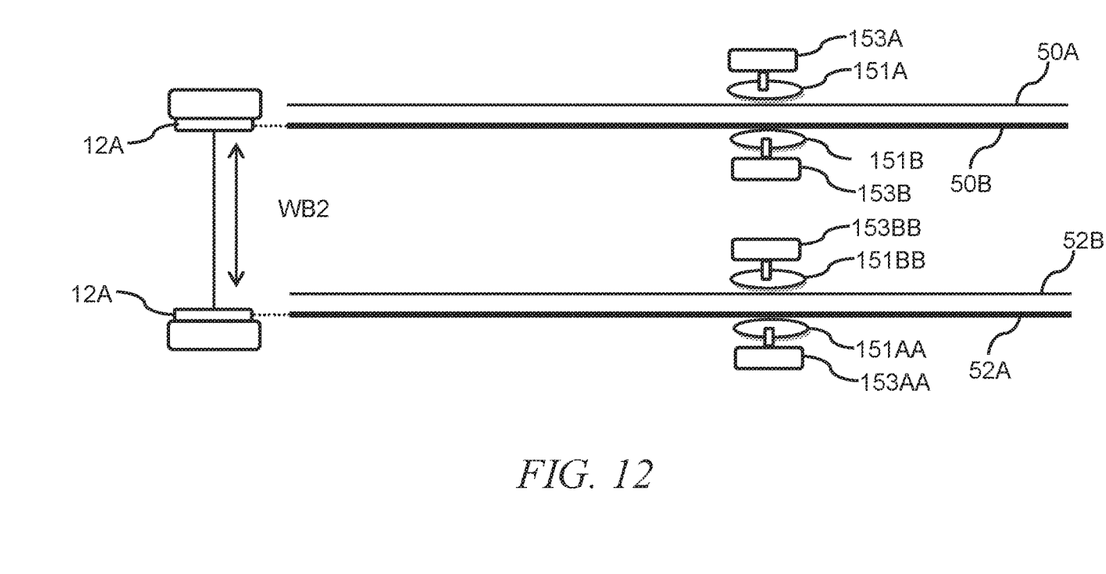
Figure 13:
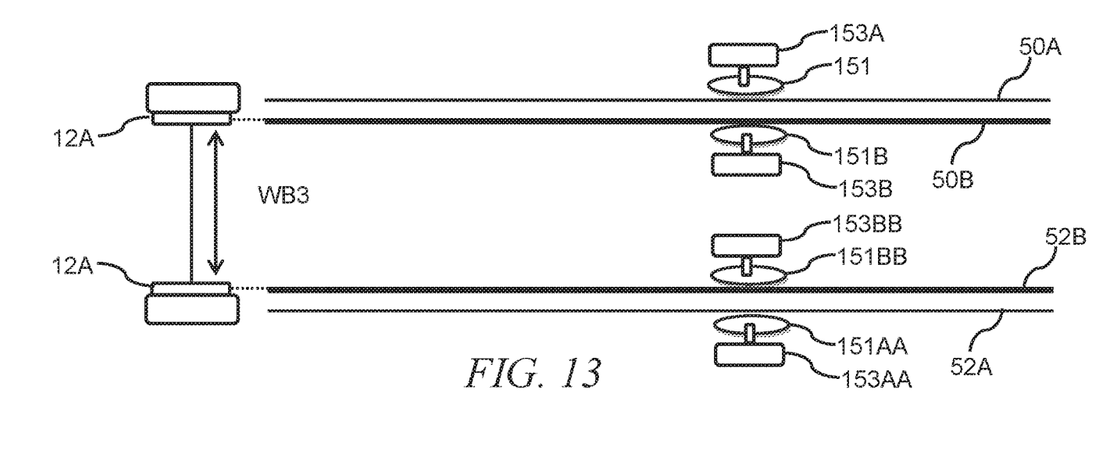

In FIGS. 11-13, the road-based conductors 50A/50B/52A/52B adapt to the wheelbase of the vehicle 100 by each section having multiple sets of road-based conductors 50A/50B/52A/52B, each road-based conductors 50A/50B/52A/52B independently retracted/extended by way of independent electromechanical raising/lowering mechanism such as cams 151 that are turned by motors 153. In the configuration of FIGS. 11-13, there are four road-based conductors 50A/50B/52A/52B, though any number of road-based conductors is anticipated including odd numbers of road-based conductors.

By raising and lowering selected pairs of the four road-based conductors 50A/50B/52A/52B, the powered roadway is capable of providing power to vehicles 100 having different wheelbases. For example, in FIG. 11, the outer road-based conductors 50A/52A are raised to match the wider wheel base WB1 by electromechanical raising/lowering mechanism such as outer cams 151A/151AA that are turned by outer motors 153A/153AA. In FIG. 11, one outer road-based conductors 52A and one inner road-based conductor 50B are raised to match the medium wheel base WB2 by electromechanical raising/lowering mechanism such as an inner cam 151B and outer cam 151AA that are turned by inner motor 153B and outer motor 153AA respectfully. In FIG. 13, the inner road-based conductors 50B/52B are raised to match the smaller wheel base WB3 by electromechanical raising/lowering mechanisms such as inner cams 151B/151BB that are turned by outer motors 153B/153BB. Note that only a single cam/motor is shown per rail section for brevity and clarity reasons.

Figure 14:
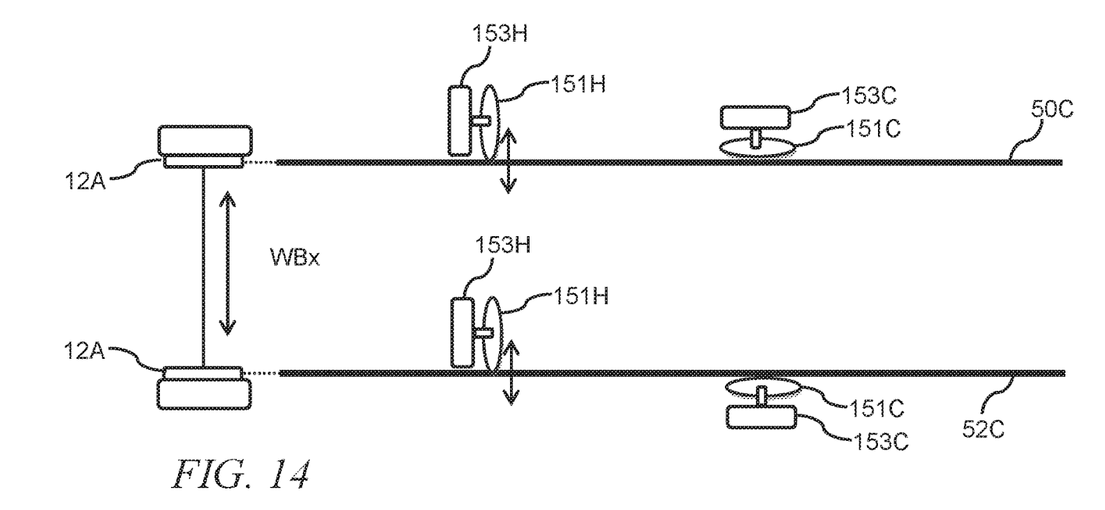

In FIG. 14, two horizontally movable road-based conductors 50C/52C have electromechanical raising/lowering mechanism such as cams 151C turned by motors 153C to raise and lower the road-based conductors 50C/52C, similar to that shown in FIGS. 4-7. In addition, each road-based conductors 50C/52C is slidably mounted to the roadway so that each of the road-based conductors 50C/52C are movable horizontally with respect to the roadway in a direction perpendicular to a lengthwise axis of the road-based conductors 50C/52C. In such, each of the road-based conductors 50C/52C are moved horizontally by way of electromechanical horizontal sliding mechanisms such as horizontal cams 151H that are independently turned by outer horizontal motors 153H. In this way, one or both of the road-based conductors 50C/52C are slid horizontally by one or more electromechanical horizontal sliding mechanisms to accommodate a range of wheelbases WBx. Note that although each road-based conductors 50C/52C is shown slidable and having electromechanical horizontal sliding mechanisms such as horizontal cams 151H that are independently turned by outer horizontal motors 153H, it is fully anticipated that one of the road-based conductors 50C/52C is fixed horizontally (not slidable) and the other of the road-based conductors 50C/52C is slidable horizontally and movable by way of one or more electromechanical horizontal sliding mechanisms such as horizontal cams 151H that are turned by outer horizontal motors 153H.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for powering vehicles, the system comprising:
a roadway having of a pair of road-based conductors, the pair of road-based conductors being parallel, a voltage is selectively delivered across the pair of road-based conductors, the pair of road-based conductors moves vertically with respect to the roadway from a lowered position to a raised position or from the raised position to the lowered position, the roadway further comprises a vehicle detection sensor;
a first tire of the vehicle having a first conductive surface and a second tire of the vehicle having a second conductive surface, the first conductive surface is in electrical contact with a first road-based conductor of the pair of road-based conductors and the second conductive surface is in electrical contact with a second road-based conductor of the pair of road-based conductors when the pair of road-based conductors in the raised position, thereby the voltage across the pair of road-based conductors is conducted into the vehicle through the first conductive surface and the second conductive surface; and
a vehicle power system of the vehicle receives the voltage from the first conductive surface and the second conductive surface and provides power to run or charge the vehicle;
wherein the voltage is delivered across the pair of road-based conductors only when the vehicle is detected by the vehicle detection sensor that is local to the pair of road-based conductors and the pair of road-based conductors is moved to the raised position by an electromechanical raising and lowering mechanism when the vehicle is detected by the vehicle detection sensor and the pair of road-based conductors is moved to the lowered position by the electromechanical raising and lowering mechanism when the vehicle is not detected by the vehicle detection sensor.

2. The system of claim 1, wherein the vehicle power system receives the voltage from the first conductive surface and the second conductive surface and provides the power to an electric motor of the vehicle for moving the vehicle.

3. The system of claim 1, wherein the vehicle power system receives the voltage from the first conductive surface and the second conductive surface and provides the power to charge at least one battery of the vehicle.

4. The system of claim 1, wherein the electromechanical raising and lowering mechanism comprises one or more cams driven by one or more motors in which lobes of the cams move the road-based conductors to and from the lowered position.

5. The system of claim 1, wherein the vehicle detection sensor detects a change in resonance as caused by metal of the vehicle.

6. The system of claim 1, wherein the vehicle detection sensor further detects an identity of the vehicle.

7. A method of providing power to a vehicle while the vehicle is on a roadway, the method comprising:
detecting when the vehicle is in proximity to a first road-based conductor and a second road-based conductor;
responsive to detecting that the vehicle is in proximity, an electromechanical raising and lowering mechanism raising the first road-based conductor and the second road-based conductor to extend above a surface of the roadway and delivering a voltage across the first road-based conductor and the second road-based conductor;

receiving one pole of the voltage by a first conductive surface of a first wheel of the vehicle, the first conductive surface being in electrical contact with the first road-based conductor; and receiving a second pole of the voltage by a second conductive surface of a second wheel of the vehicle, the second conductive surface being in electrical contact with the second road-based conductor.

8. The method of claim 7, further comprising:

detecting when the vehicle is no longer in proximity of the first road-based conductor and the second road-based conductor, and responsive to the detecting, the electromechanical raising and lowering mechanism lowering the first road-based conductor and the second road-based conductor to be flush or below the surface of the roadway.

9. The method of claim 7, wherein the step of delivering the voltage across the first road-based conductor and the second road-based conductor is only performed while detecting that the vehicle is in proximity of the first road-based conductor and the second road-based conductor.

10. The method of claim 7, wherein the electromechanical raising and lowering mechanism comprises a cam coupled to a motor.

11. The method of claim 7, wherein the electromechanical raising and lowering mechanism comprises an actuator.

12. The method of claim 7, wherein the detecting further comprises detecting an identification of the vehicle.

13. The method of claim 12, further comprising billing based upon the identification of the vehicle.

14. A system for powering vehicles on a roadway, the system comprising:

the roadway having a first road-based conductor and a second road-based conductor that are parallel, a source of electricity and a controller;

a first set of electromechanical raising and lowering mechanisms electrically controlled by the controller, the first set of electromechanical raising and lowering mechanisms are coupled to a corresponding one of the first road-based conductor and the second road-based conductor, and the first set of electromechanical raising and lowering mechanisms move the first road-based conductor and the second road-based conductor vertically with respect to the roadway, deploying or retracting the first road-based conductor and the second road-based conductor;

a first wheel of the vehicle comprising a first conductive surface and a second wheel of the vehicle comprising a second conductive surface; and a vehicle detection sensor is operatively interfaced to the controller such that upon detection of the vehicle by the vehicle detection sensor, the controller electrically operates the first set of electromechanical raising and lowering mechanisms to deploy the first road-based conductor and the second road-based conductor; and the controller connects the source of the electricity across the first road-based conductor and the second road-based conductor, thereby providing the electricity to the vehicle through the first conductive surface and the second conductive surface; and when the vehicle detection sensor signals an absence of the vehicle, the controller electrically operates the first set of electromechanical raising and lowering mechanisms to retract the first road-based conductor and the second road-based conductor; and the controller disconnects the source of the electricity from the first road-based conductor and the second road-based conductor.

15. The system of claim 14, wherein the vehicle detection sensor further detects an identity of the vehicle.

16. The system of claim 15, wherein the first road-based conductor and the second road-based conductor are interfaced to the roadway by a sliding mechanism that enables one or both of the first road-based conductor and the second road-based conductor to slide horizontally with respect to the roadway, the system further comprising a second set of electromechanical mechanisms electrically interfaced to the controller and mechanically interfaced to one or both of the first road-based conductor and the second road-based conductor such that the controller signals the second set of electromechanical mechanisms to move one or both of the first road-based conductor and the second road-based conductor to adjust a distance between the first road-based conductor and the second road-based conductor to accommodate different wheelbases.

17. The system of claim 15, wherein the first road-based conductor and the second road-based conductor are interfaced to the roadway by a sliding mechanism that enables one or both of the first road-based conductor and the second road-based conductor to slide horizontally with respect to the roadway, the system further comprising a second set of electromechanical mechanisms electrically interfaced to the controller and mechanically interfaced to one or both of the first road-based conductor and the second road-based conductor such that the controller determines a wheelbase of the vehicle by the identity of the vehicle and signals the second set of electromechanical mechanisms to move one or both of the first road-based conductor and the second road-based conductor to adjust a distance between the first road-based conductor and the second road-based conductor to match the wheelbase.

\* \* \* \* \*